UNITED STATES PATENT OFFICE 2,481,370

BITUMEN COATED SURFACE AND METHOD OF MAKING

Jacob van den Berge, Amsterdam, Netherlands, assignor to Shell Development Company, San Francisco, Calif., a corporation of Delaware No Drawing. Application March 25, 1946, Serial No. 657,063. In the Netherlands April 17, 1945

4 Claims. (Cl. 117—92)

This invention relates to novel coating systems for protecting various surfaces, and particularly relates to the imposing on such surfaces of a plurality of layers of asphaltic bitumens or bituminous substances possessing different penetration indices, i. e. having different temperature susceptibilities.

It is frequently desirable, if not necessary, to coat or dispose on a given surface to be protected several types of bituminous substances possessing different physical and/or chemical characteristics. Thus, in some cases of protecting surfaces it is frequently desirable to coat or impregnate the material with a bituminous substance possessing a relatively low penetration index and then cover the thus treated material with a bituminous substance, i. e. asphaltic bitumen, having a relatively higher penetration index. It is known that when asphaltic bitumens possessing different penetration indices are disposed in contact with each other a certain phenomenon which is frequently undesirable occurs. For instance, when an asphaltic bitumen having a relatively high penetration index such as a blown petroleum asphalt is disposed or placed in contact with an unoxidized or normal type asphaltic bitumen, the adhesion between the two bitumens becomes relatively poor so that the layers may be relatively easily removed from each other. The same phenomenon frequently occurs when two asphaltic bitumens of the same type, for example of the blown type (which are frequently called gel-type asphaltic bitumens as distinguished from the unoxidized or normal type asphaltic bitumens which are frequently termed sol-type asphalts or asphaltic bitumens) but possessing markedly different penetration indices, are superimposed or placed one on the other. Thus, the placing of a blown type asphalt having a penetration index of about +6 on a layer of a blown petroleum asphalt having a penetration index of +3 will result in a laminated structure or coating in which the adhesion between the layers will be lost in a relatively short period of time. Without any intent of being limited by any theory of the case, this loss of adhesion with time is considered to occur because the malthenes (i. e. petrolenes) present in the asphaltic bitumen of the blown type is diffused into the surface of the unoxidized or normal type asphaltic bitumen or into the surface of the asphaltic bitumen having the relatively lower penetration index, thereby causing the surface layer of the latter to become more or less cut back. This in turn forms a soft oily intermediate layer between the two asphaltic bitumens, the good adhesion between the two bitumens being thereby lost so that the layers may be readily removed from each other. This phenomenon whereby the petrolenes form an asphaltic bitumen having a relatively higher penetration index is exuded into an asphaltic bitumen of a relatively lower penetration index is known as the sweating or bleeding phenomenon. Manifestly such formation of a soft oily intermediate layer is highly undesirable and in fact detrimental, since it causes a sliding or shifting of the two layers with respect to each other.

The use of laminated coatings of asphalts possessing different penetration indices is frequently desired, particularly where the softer of the two asphalts is employed to provide a good bond between the surface to be protected and the harder asphalt. For instance, such laminated coatings are employed in the manufacture of asphalt roofing, felts and insulation windings in which the paper, felt or fabric is first impregnated with asphaltic bitumens of the unoxidized type, after which a layer of asphaltic bitumen of the blown type having a higher penetration index is disposed over the first asphaltic coating. Similarly, various other structures such as those of metal, concrete, wood and the like, are frequently coated with or protected by laminated coatings of asphaltic bitumens having different penetration indices, an example of such structures being the iron or other ferrous tubes which are first provided with a basic layer of an unoxidized asphaltic bitumen and then with an outside coating of an asphaltic bituminous material of the blown type.

Since the above-mentioned sweating or bleeding phenomenon permits the relative displacement of the outer layer with respect to the lower or inner layer of a laminated coating of the above type, the protection afforded by the asphaltic coating is lost in a relatively short time. It is therefore an object of the present invention to avoid the above and other defects and to provide a laminated asphaltic structure which does not possess the above defects. Another object is to provide a method whereby a plurality of coatings of asphaltic bituminous materials may be applied to the surface to be protected thereby, which asphaltic bitumens will maintain good adhesion toward each other even after prolonged standing. A still further object is to provide a laminated coating of asphaltic bitumens of different penetration indices in which no or substantially no sweating or bleeding occurs.

It has now been discovered that the above and other objects may be attained by coating the surface to be protected with a plurality of layers of bituminous substances having different penetration indices, the asphaltic bitumen having the lower penetration index consisting of or containing at least about 10% by weight of asphaltic bituminous substances in which the molecular ratio of the carbon to hydrogen of the asphaltenes of said bitumen is greater than about 0.95. The invention may be stated to reside in the process of coating the surface to be protected with at least two layers of asphaltic bitumens of different penetration indices, the bitumen having the lower penetration index consisting of or containing at least 10% by weight of asphaltic bitumens possessing the above-mentioned characteristics, namely bitumens in which the carbon to hydrogen mole ratio of the asphaltenes is greater than about 0.95. The invention also includes the laminated compositions thus produced. Although any asphaltic bituminous substance possessing the above characteristics may be used in the process of the present invention to produce laminated coatings in which the so-called sweat phenomenon does not occur, or occurs to only a slight and relatively immaterial degree, it is generally preferable to employ as the bitumen having the relatively lower penetration index an asphaltic bitumen prepared from residues obtained during the cracking of mineral oils or of their fractions. A particularly suitable bitumen containing asphaltenes in which the carbon to hydrogen mole ratio is greater than about 0.95 may be prepared from the residues of liquid phase or mixed phase cracking, e. g. by the Dubbs process, the residual oils thus formed possessing the desired penetration index characteristics. Also, certain straight run or even blown bitumens such as those prepared from some of the asphaltic petroleum from Netherlands Indies may be employed as the bitumen having the relatively lower penetration index since such bitumens contain appreciable amounts of asphaltenes having carbon to hydrogen ratios of greater than 0.95.

Any type of asphaltic bitumen, and particularly those of the blown type, may be used as the second asphalt in the production of the laminated coatings provided such asphaltic bitumen has a sufficiently high penetration index, one of the essential features of such asphalt being that it possesses sufficient hardness so that it will not dent on contact with objects or slough off the surface. These blown type asphaltic bitumens may be produced from a topped mineral oil, a natural asphalt, still residual asphalt, naphthenic extract from lubricating stock, or other bituminous substance.

Preferably the coating of the surface to be protected is effected by first applying thereto or impregnating it with the asphaltic bitumen having the relatively lower penetration index, which bitumen, in accordance with the process of the present invention, comprises asphaltic bitumens in which the carbon to hydrogen mole ratio of the asphaltenes is greater than about 0.95, after which the thus coated surface is provided with a second coating of an asphaltic bitumen, preferably of the blown type, said bitumen possessing a higher penetration index than the first bituminous substance applied to the material to be protected.

The following examples are presented for the purpose of further illustrating the present invention:

Example I

A jute fabric was first impregnated with a Venezuelan asphaltic bitumen having the following characteristics: a penetration of 45 at 25° C.; a ring and ball melting point of 53.5° C.; a penetration index of —0.6; an asphaltene content of 15% by weight; and a carbon to hydrogen mole ratio of the asphaltenes of 0.80. Thereafter the fabric thus coated was provided on both sides with a coating of a blown type asphaltic bitumen having a penetration of 40 at 25° C., a ring and ball melting point of 85° C., and a penetration index of +4.4. It was noted that when the fabric thus coated was maintained at a temperature of 40° C., sweating occurred after even a short storage period, the layers of asphalt being readily removable from each other.

Example II

A jute fabric was coated in the same manner as that described in Example I except for the fact that the first impregnation of the fabric was effected with a Dubbs asphaltic bitumen having a penetration of 43 at 25° C., a ring and ball melting point of 43° C., a penetration index of —2.1, an asphaltene content of 30% by weight, and a carbon to hydrogen ratio of the asphaltenes equal to 1.25, this asphaltic bitumen being employed instead of the Venezuelan asphalt used for the first impregnation described in the previous example. As in said example, the impregnated fabric was then coated with the blown type asphaltic bitumen having the physical and chemical characteristics set forth in Example I. It was found that no sweating occurred even after a prolonged storage at a temperature of 40° C. There was excellent adhesion between the bituminous layers.

Example III

A jute fabric was first impregnated with an asphaltic bitumen from asphaltic petroleum oil originating in Netherlands Indies, this asphaltic bitumen having a penetration of 45 at 25° C., a ring and ball melting point of 48.5° C., a penetration index of —1.8, an asphaltene content of 12% by weight, and a carbon to hydrogen mole ratio of the asphaltenes of 1.04. The thus impregnated fabric was then coated on both sides with the blown type asphaltic bitumen described in Example I. It was found that no sweating occurred, even after a long storage at a temperature of 40° C., and that there was excellent adhesion between the bituminous layers with which the fabric was coated.

Example IV

A jute fabric was first impregnated with a mixture of equal parts by weight of the Venezuelan bitumen described in Example I and of the Dubbs asphaltic bitumen employed for the fabric impregnation in Example II. Thereupon the thus impregnated fabric was provided on both sides with coatings of a blown type asphaltic bitumen having a penetration of 41 at 25° C., a ring and ball melting point of 86° C., and a penetration index of +4.5. It was noted that no sweat phenomena occurred, even after the fabric thus treated had been stored for a long time. Also, there was excellent adhesion between the bitumen layers employed for the coating and impregnation of the fabric.

Example V

A bituminous asphaltic substance was obtained by mixing 15 parts by weight of a Dubbs asphaltic bitumen having a penetration of 43 at 25° C., a melting point of 43° C., a penetration index of −2.1, an asphaltene content of 30% by weight, and a carbon to hydrogen mole ratio of the asphaltenes equal to 1.25, and 85 parts by weight of the Venezuelan asphaltic bitumen having a penetration of 45 at 25° C., a melting point of 53.5° C., a penetration index of −0.6, and an asphaltene content of 15% by weight, said asphaltenes having a carbon to hydrogen mole ratio of 0.80. This mixture was used to provide a first layer on an iron tube, the coating being effected by immersion. Thereafter this immersion layer was provided with a second coating of a blown type asphaltic bitumen having the same characteristics as those of the blown type asphaltic bitumen employed for the outer coating in Example IV. The tube thus coated was then stored for a long time at a temperature of 40° C. It was found that no sweating occurred, and that there was excellent adhesion between the bituminous layers.

The invention claimed is:

1. In a method of coating fabrics with asphaltic bituminous materials of different penetration indices, the steps of first impregnating the fabric with an asphaltic bitumen having a relatively lower penetration index, and having an asphaltene content of at least 12%, the asphaltenes of said asphaltic bitumen having a carbon-to-hydrogen mole ratio of at least about 0.95, and then applying to the surfaces of the thus treated fabric a layer of an asphaltic bitumen having a penetration index higher than that of the first bitumen.

2. In a method of protecting fabrics wherein the fabric is first coated with an asphaltic bituminous material of a relatively lower penetration index, and wherein at least one of the thus treated surfaces of the fabric is then coated with an asphaltic bituminous material of a relatively higher penetration index, the improvement which comprises employing as the asphaltic bituminous material having the relatively lower penetration index an asphaltic bituminous material which contains at least 10% by weight of a bitumen the asphaltene content of which is at least 12%, said asphaltenes having a carbon-to-hydrogen mole ratio of at least about 0.95.

3. In a method of coating surfaces to be protected with at least two asphaltic bituminous materials of different penetration indices, the step of applying to said surface, as the bituminous material having the relatively lower penetration index, a bitumen containing at least 10% by weight of a bituminous material the asphaltenes of which amount to at least 12% by weight, said asphaltenes having a carbon-to-hydrogen mole ratio of at least about 0.95.

4. A surface protected by a coating comprising laminated layers of asphaltic bituminous materials of different penetration indices, the material having the relatively lower penetration index containing at least 10% by weight of a bituminous material having an asphaltene content of at least 12%, said asphaltenes having a carbon-to-hydrogen mole ratio of at least about 0.95.

JACOB van den BERGE.

REFERENCES CITED

The following references are of record in the file of this patent:

UNITED STATES PATENTS

| Number | Name | Date |
|---|---|---|
| 1,731,067 | Swenson | Oct. 8, 1929 |
| 1,842,448 | Eckert | Jan. 26, 1932 |
| 1,884,471 | Wittenberg | Oct. 25, 1932 |
| 2,025,709 | Baskin | Dec. 31, 1935 |